United States Patent
Kim et al.

(10) Patent No.: US 8,392,632 B2
(45) Date of Patent: Mar. 5, 2013

(54) METHOD AND APPARATUS FOR DATA PROCESSING IN MOBILE COMMUNICATION SYSTEM

(75) Inventors: Hye-Jeong Kim, Suwon-si (KR); Do-Young Lee, Suwon-si (KR); Hyun-Gu Lee, Yongin-si (KR); Byoung-Jae Bae, Suwon-si (KR); Young-Taek Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 421 days.

(21) Appl. No.: 12/031,284

(22) Filed: Feb. 14, 2008

(65) Prior Publication Data

US 2008/0195781 A1 Aug. 14, 2008

(30) Foreign Application Priority Data

Feb. 14, 2007 (KR) .................. 10-2007-0015337

(51) Int. Cl.
*G06F 3/00* (2006.01)
(52) U.S. Cl. .......................... 710/36; 710/22
(58) Field of Classification Search ........ 710/36
See application file for complete search history.

(56) References Cited

U.S. PATENT DOCUMENTS

| | | | | |
|---|---|---|---|---|
| 5,053,949 | A | * | 10/1991 | Allison et al. ................. 714/31 |
| 2004/0116139 | A1 | * | 6/2004 | Yi et al. ........................ 455/503 |
| 2004/0131046 | A1 | * | 7/2004 | Kim et al. ..................... 370/351 |
| 2005/0025188 | A1 | | 2/2005 | Numakura et al. |
| 2005/0089033 | A1 | | 4/2005 | Gupta et al. |
| 2007/0064724 | A1 | * | 3/2007 | Minami et al. ................ 370/463 |
| 2008/0151893 | A1 | * | 6/2008 | Nordmark et al. ............ 370/392 |

FOREIGN PATENT DOCUMENTS

| | | |
|---|---|---|
| JP | 8-116348 | 5/1996 |
| KR | 1999-006371 | 2/1999 |
| KR | 1020060103683 | 10/2006 |
| WO | WO 01/11903 | 2/2001 |

OTHER PUBLICATIONS

Flik T et al: "MIKROPROZESSORTECHNIK, Kap. 7, 7.1 and 7.2", XP-002301929, Jan. 1, 1994.

* cited by examiner

*Primary Examiner* — Henry Tsai
*Assistant Examiner* — John Roche
(74) *Attorney, Agent, or Firm* — The Farrell Law Firm, P.C.

(57) ABSTRACT

Provided is a method and an apparatus for processing data at a high speed by a UE for data communication. In the method, received data is divided into a header and payload information, which are then stored in different memories. In the method, header processing and payload data processing can be performed in parallel, and two memory devices can perform parallel processing without sharing a bus.

13 Claims, 13 Drawing Sheets

METHOD AND APPARATUS FOR DATA PROCESSING IN MOBILE COMMUNICATION SYSTEM

PRIORITY

This application claims the priority under 35 U.S.C. §119 (a) to a Korean Patent Application entitled "Method And Apparatus For Data Processing In Mobile Communication System" filed in the Korean Industrial Property Office on Feb. 14, 2007 and assigned Serial No. 2007-15337, the contents of which are hereby incorporated by reference.

BACKGROUND OF THE INVENTION

1. Field of the Invention

The present invention relates to a mobile communication system, and more particularly to a method and an apparatus for processing data at a high speed by a User Equipment (UE).

2. Description of the Related Art

In general, a commercial transmission data rate in a mobile communication system has a maximum data rate of about 100 Mbps, and modem chips of each UE in charge of data transmission/reception with a Node B have nearly the same structure and use nearly the same data processing scheme. Procedures for processing reception data and transmission data can be divided into hardware procedures and software procedures. Specifically, most procedures performed by physical layer entities, such as modulation/demodulation, interleaving/deinterleaving, and encoding/decoding, are processed by hardware, and protocol stacks, such as signaling and Automatic Repeat reQuest (ARQ), are processed by software.

FIG. 1 is a block diagram illustrating a structure of a conventional UE modem.

Referring to FIG. 1, in the case of downlink for receiving data from a Node B, data received through an antenna is input to a modem 131 within a modem chip 130 through a Radio Frequency (RF) filter 110 and a Broad Band Amplifier (BBA) 120. Then, the data is subjected to processing, such as demodulation and decoding, in the modem 131, and is then stored in an external memory 140. The Central Processing Unit (CPU) 132 either stores the data having been subjected to the protocol stack process in the external memory 140 within the UE according to the location of an Application Processor (AP) or transmits the data to an external device 170 through an external interface.

During an uplink for transmitting data to the Node B, data received from the external device 170 or the AP 151 within the UE is first stored in the external memory 140, is subjected to the protocol stack process in the CPU 132, and is then transferred to the modem 131. Thereafter, the data is subjected to procedures, such as encoding and modulation, and is then transmitted to the Node B through the BBA 120, the RF filter 110, and the antenna.

FIG. 2 is a signal flow diagram illustrating a process of processing data received by a receiver unit of a conventional $3^{rd}$ Generation Partnership Project (3GPP)-based UE modem.

Referring to FIG. 2, data received through an antenna is input to a modem after passing through an RF filter. Then, the modem performs demodulation and decoding of the data, stores the data in a decoder buffer, and then generates a Reception (Rx) interrupt in step 201. Then, a Lower Medium Access Control (LMAC) device transfers the data from the decoder buffer to an external memory in step 202, and generates a data transfer done signal in step 203. The LMAC may be implemented either by hardware or by software to be processed by the CPU. When the data is completely transferred to the external memory, the CPU reads the data in the external memory and sequentially performs the protocol stack processes for protocols, such as Medium Access Control (MAC) protocol, Radio Link Control (RLC) protocol, a Radio Resource Control (RRC) protocol, and Packet Data Convergence Protocol (PDCP). When the protocol stack processes are completed, the CPU sends the data to the application layer. FIG. 2 illustrates transmission of data to a Personal Computer (PC) through a Universal Serial Bus (USB) device, based on an assumption that data is downloaded through a PC, which is one of representative high-speed data applications. That is, the CPU reads data from the external memory in step 207, and arranges the data and stores the arranged data again in the external memory in step 208. Thereafter, when an interrupt is received from the USB device in step 209, the CPU reads the data from the external memory and transfers the read data to the USB in step 210. In step 211, the CPU determines whether the data transfer has been completed. If the data transfer has been completed at step 211, the CPU deallocates the memory in step 212. If the data transfer has not been completed at step 211, the CPU returns to step 207.

When the application operates within the modem chip, the data may be transmitted either to a predetermined memory or to an external device through an external interface device, such as PC Memory Card International Association (PCM-CIA) or Local Area Network (LAN).

FIG. 3 is a signal flow diagram illustrating a process of processing data by a transmitter unit of a conventional 3GPP-based UE modem.

Referring to FIG. 3, when data is received through an external interface device, such as a Universal Serial Bus (USB) device, in step 301, the CPU transfers the received data to the external memory in steps 302 and 303 and performs a PDCP process in step 304. In step 305, if an outgoing interrupt is received from an encoder buffer, the CPU determines a transport format by using allocated resources and various conditions. In steps 306 and 307, the CPU performs RLC and MAC processes, and then generates a MAC Protocol Data Unit (PDU). Then, the CPU reads data from the external memory in step 308, arranges the data in step 309, and then transfers the data to the encoder buffer in step 310.

In most cases, during the process of producing a MAC PDU from multiple RLC PDUs, a one-time data copy is performed for all the MAC PDUs, in order to achieve data alignment and concatenation.

The largest problems in applying the conventional UE structure and data processing scheme as described above to a high-speed data communication of at least 50 Mbps include the external memory access speed and the bottleneck phenomenon at the external memory interface. In the case of data transmission using an internal bus, it is possible to achieve a transmission of as much data as the bus bandwidth allows within 1~2 cycles with reference to the internal bus clock cycle. For example, when the bus bandwidth is 32 bits, it is possible to a achieve transmission of 32 bits of data within 1~2 cycles. However, in order to transmit data to the external memory or read data from the external memory, an average of 10~15 cycles of access time is necessary. Although the length of the access time depends on various parameters, such as the type of the external memory, the type of the memory controller, the bus speed, and the types and the number of Internet Protocols (IPs), the access time to the external memory has a length of at least 10 cycles on the average, which corresponds to a maximum of at least ten times of that of the internal memory. In the case of CPU processing, it is possible to reduce the number of times the external memory is accessed by using a cache memory. However, in the case of data transmission, new data is transmitted or received at every time unit, and the data size is much larger than the size of the cache memory. Therefore, in the case of data transmission, it is nearly impossible to reduce the number of times the external memory is accessed, and a time required to write on the external memory or read from the external memory increases by a maximum of at least ten times.

FIG. 4 is a block diagram illustrating a simplified structure of an external memory interface of a conventional UE.

Referring to FIG. 4, each IP block, such as a CPU 410, a Direct Memory Access (DMA) block 420, a modem 430, and an external device InterFace (I/F) 440, can access an external memory 470 through a memory controller 450 performing the scheduling. An internal bus 460 has a multi-layer structure and can perform parallel processing. However, it is noted that a bottleneck phenomenon occurs in the memory controller 450. Further, an increase in the number of external memory interfaces requires an increase in the number of pins of the modem chip by the size of the bus bandwidth.

Another problematic point in the high-speed data communication is the performance of the CPU. The higher the data transmission rate, the greater the number of processes performed by the CPU. However, since the CPU has a limited Million Instructions Per Second (MIPS) rate, the CPU may cause a system error when it fails to properly perform each process within the required time.

For example, a chip supporting High Speed Downlink Packet Access (HSDPA) uses a CPU clock of about 300 MHz in order to process data at a speed of 7.2 Mbps. However, there is a technical limit in increasing the CPU clock in order to increase the processing capability or reduce the internal bus speed and the access time. Therefore, it is not easy to achieve high-speed data processing by improving hardware performance.

SUMMARY OF THE INVENTION

Accordingly, the present invention has been made to solve the above-mentioned problems occurring in the prior art, and the present invention provides a data transfer path, a data processing method, and a data processing apparatus, which can achieve high-speed data processing.

In accordance with an aspect of the present invention, there is provided a User Equipment (UE) apparatus for supporting high speed data communication, the UE including a memory device including at least one internal memory and at least one external memory; at least one Internet Protocol (IP) device; and a bus device for interconnecting the internal and external memories of the memory device with the IP devices while preventing overlapping of data paths between the internal and external memories and the IP devices.

In accordance with another aspect of the present invention, there is provided a method for processing incoming data by a UE in a mobile communication system supporting high speed data communication, the method including dividing data, which has been received from a Node B and decoded, into a header and payload data; storing the header and the payload data in different memories throughout independent data paths; performing a protocol stack process by using the header by a Central Processing Unit (CPU); and transferring the payload data to an application layer and decoding the payload data according to an instruction of the CPU, wherein the step of performing a protocol stack process and the step of decoding the payload data are independently performed in parallel.

In accordance with another aspect of the present invention, there is provided a method for processing outgoing data by a UE in a mobile communication system supporting high speed data communication, the method including performing a process for payload data received from an application layer and storing the payload data in a first memory throughout a first data path according an instruction of a CPU; generating a header of the outgoing data through a protocol stack process and storing the generated header in a second memory throughout a second data path independently from the first data path by the CPU; and reading the header and the payload data and storing the header and the payload data in an encoding buffer by an embedded DMA block according an instruction of a CPU, wherein the step of storing the payload data in the first memory and the step of storing the header in the second memory are independently performed in parallel.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear.

Although the following description of the present invention discusses a $3^{rd}$ Generation Partnership Project (3GPP)

Long Term Evolution (LTE) system as an example, the present invention can be applied to a UE of all mobile communication systems without any particular change.

The present invention provides a method that can minimize access to an external memory and maximize parallel processing by improving an existing structure causing all processes to pass through the external memory, which limits the parallel processing, in a UE modem of a mobile communication system.

Figure 1:
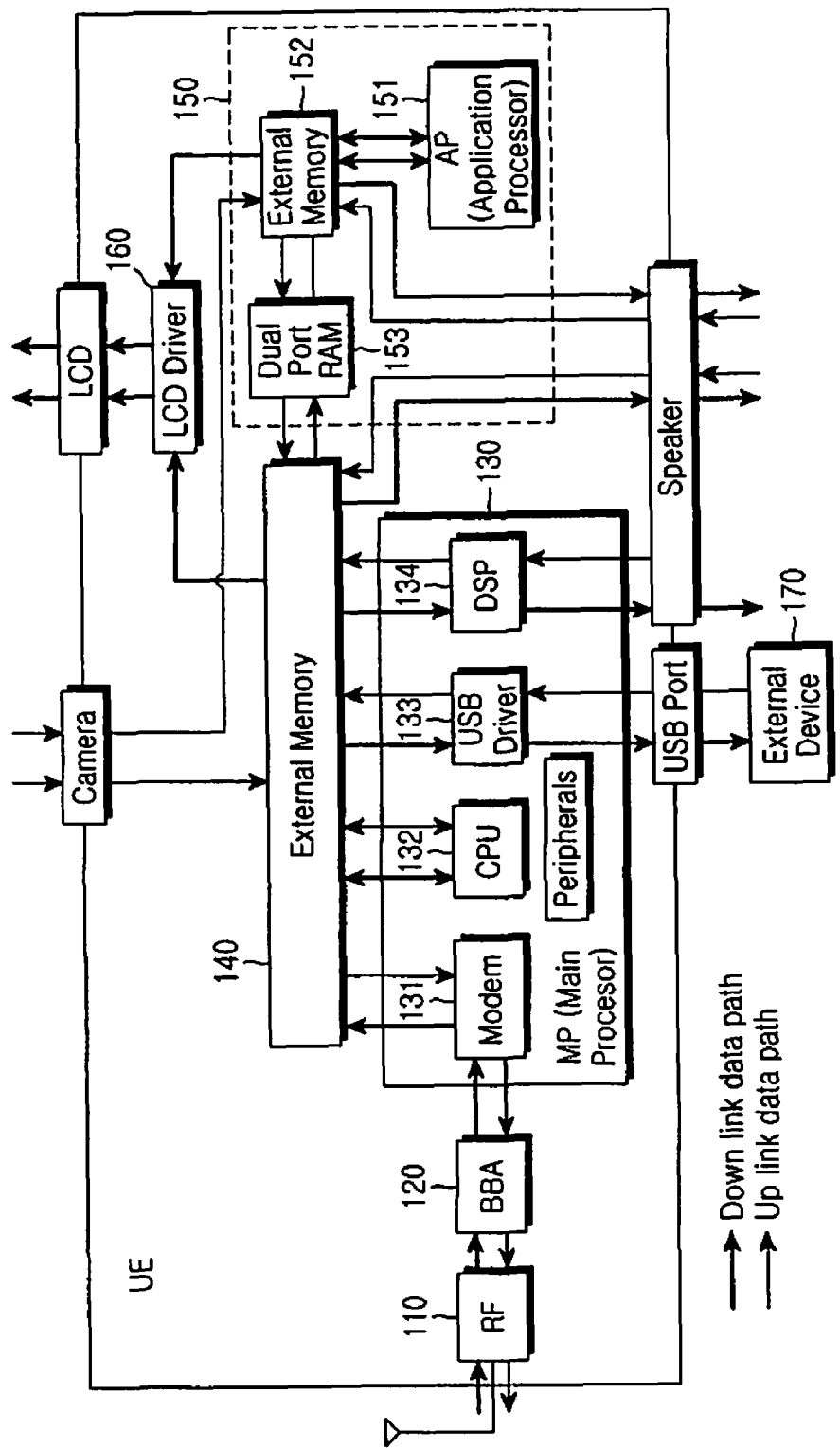
FIG. 1 is a block diagram illustrating a structure of a conventional UE modem.
Figure 2:
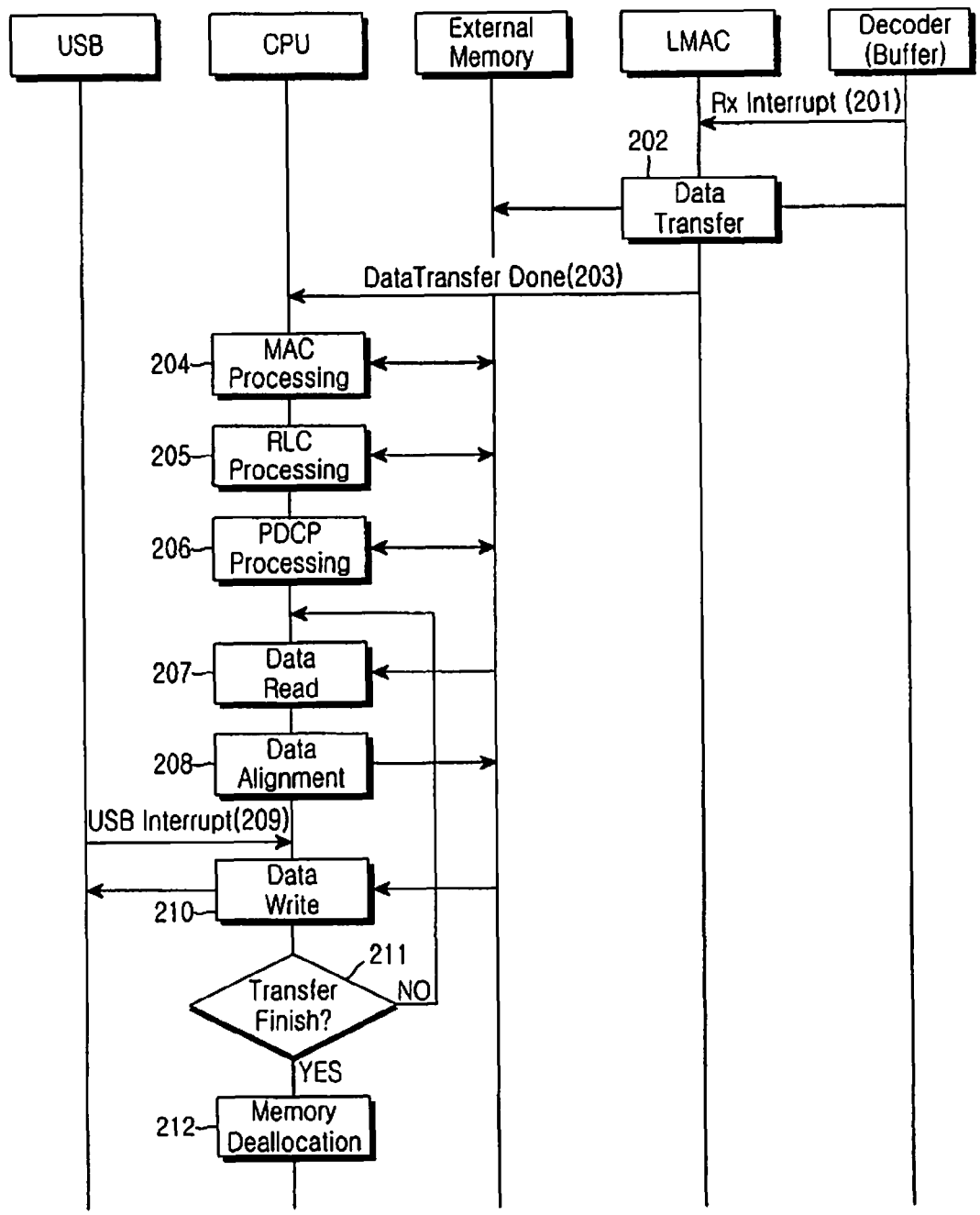
FIG. 2 is a signal flow diagram illustrating a process of processing data received by a receiver unit of a conventional 3GPP-based UE modem.
Figure 3:
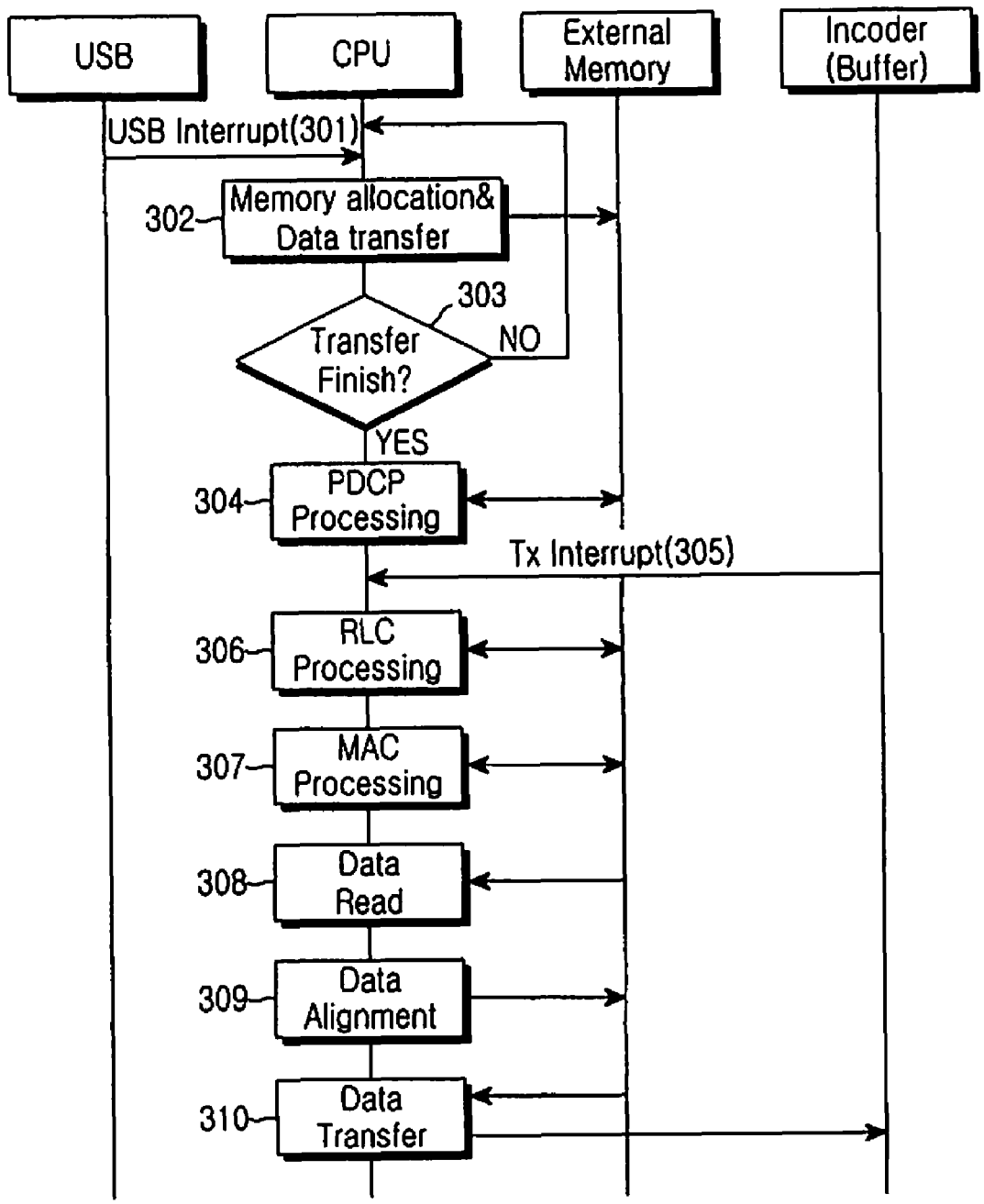
FIG. 3 is a signal flow diagram illustrating a process of processing data by a transmitter unit of a conventional 3GPP-based UE modem.
Figure 4:
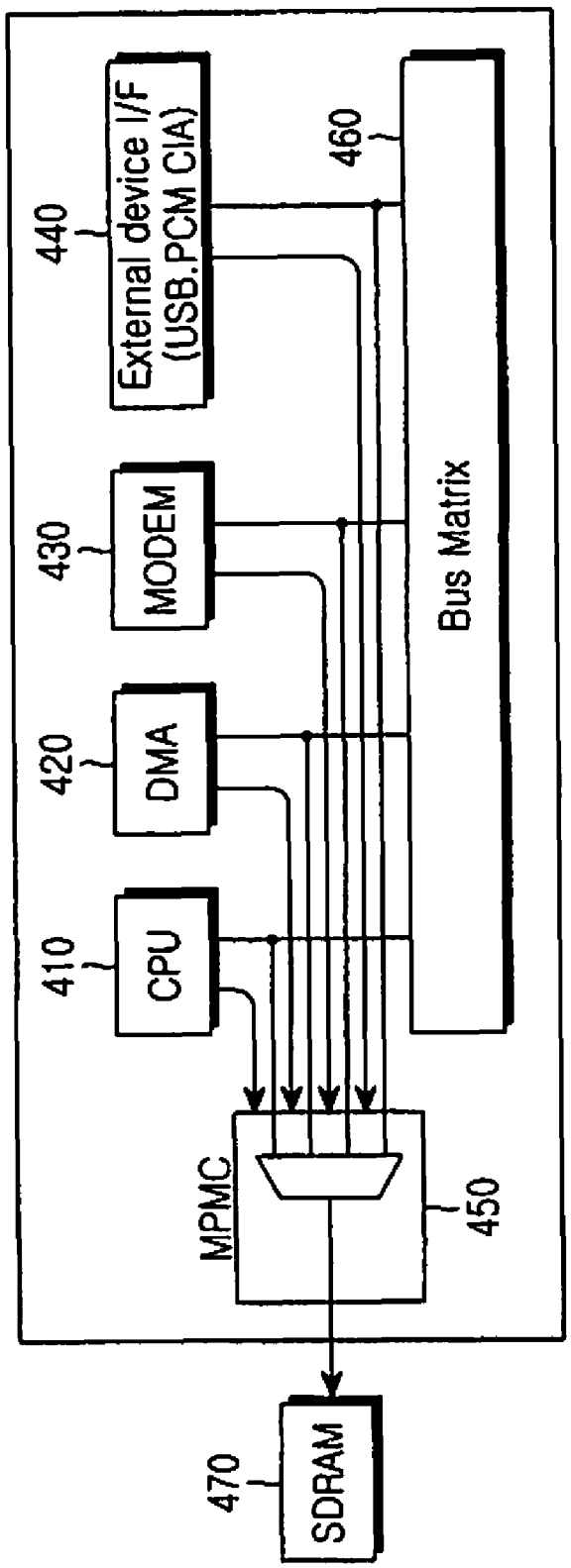
FIG. 4 is a block diagram illustrating a simplified structure of an external memory interface of a conventional UE.
Figure 5:
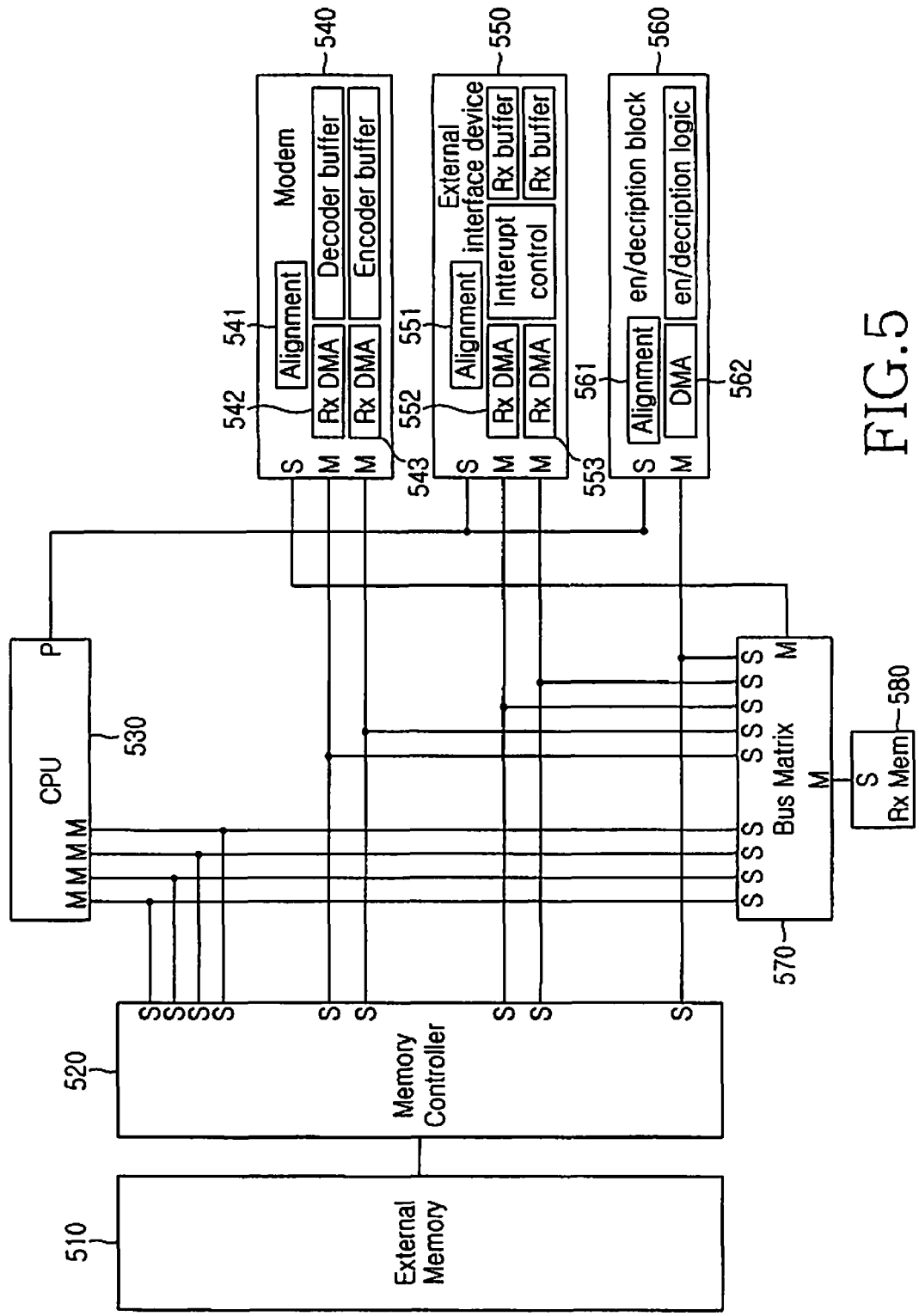
FIG. 5 illustrates a structure of a UE according to a first embodiment of the present invention, which corresponds to a structure supporting basic parallel processing.

FIG. 5 illustrates a structure of a UE according to a first embodiment of the present invention, which corresponds to a structure supporting basic parallel processing.

Referring to FIG. 5, the UE includes memories divided into an external memory 510 and an internal memory 580, and a multi-layer bus matrix 570 designed to enable the external memory 510 and the internal memory 580 to independently operate. Although FIG. 5 shows a CPU 530, a modem 540, an external interface device 550, and an encryption/decryption block 560 as examples of IP blocks, other IP blocks can also be connected in the same way. Further, the UE illustrated in FIG. 5 uses a single internal memory 580, and each of the IP blocks 540, 550, and 560 can access the internal memory 580 through the bus matrix 570. Also, although the internal memory 580 of the UE illustrated in FIG. 5 has one port, the UE may use a Dual Port Random Access Memory (DPRAM) having two ports, which enables two IP blocks to simultaneously access the internal memory to perform data processes.

Further, each of the IP blocks includes an embedded DMA block or embedded DMA blocks 542 and 543, 552 and 553, or 562 and an alignment block 541, and thus can perform the data alignment simultaneously while transmitting the data by itself. The data alignment refers to configuration of data in bytes or words through a shift operation while combining the data when data to be processed has not been configured in bytes or words. In a conventional UE, the entire data is copied for the data alignment. However, such a data copy process can be omitted by including the alignment blocks in the IP blocks. The embedded DMA block includes multiple descriptors for input of information of data to be transmitted, so that the embedded block can transmit data distributed over multiple positions while aligning the data according to a given order, or transmit data to multiple distributed positions. The descriptors may be either implemented by multiple registers or implemented in the internal or external memory in the form of a linked list. Further, it is possible to maximize the parallel processing by including a reception DMA block 552 and a transmission DMA block 553 in the external interface device 550.

In the external interface device, such as a USB device, an interrupt for data transmission/reception frequently occurs during high-speed data processing due to the limited size of the internal buffer. In the case of LTE, using a buffer having a size of 512 bytes causes a maximum of five interrupts every 0.5 ms. The present invention proposes a structure for basic interrupt processing for data transmission/reception in a DMA block, while allowing other device drivers, such as initialization and exceptional processing, to be processed by the CPU as is in a conventional UE. Therefore, the present invention can largely reduce the load of the CPU.

Figure 6:
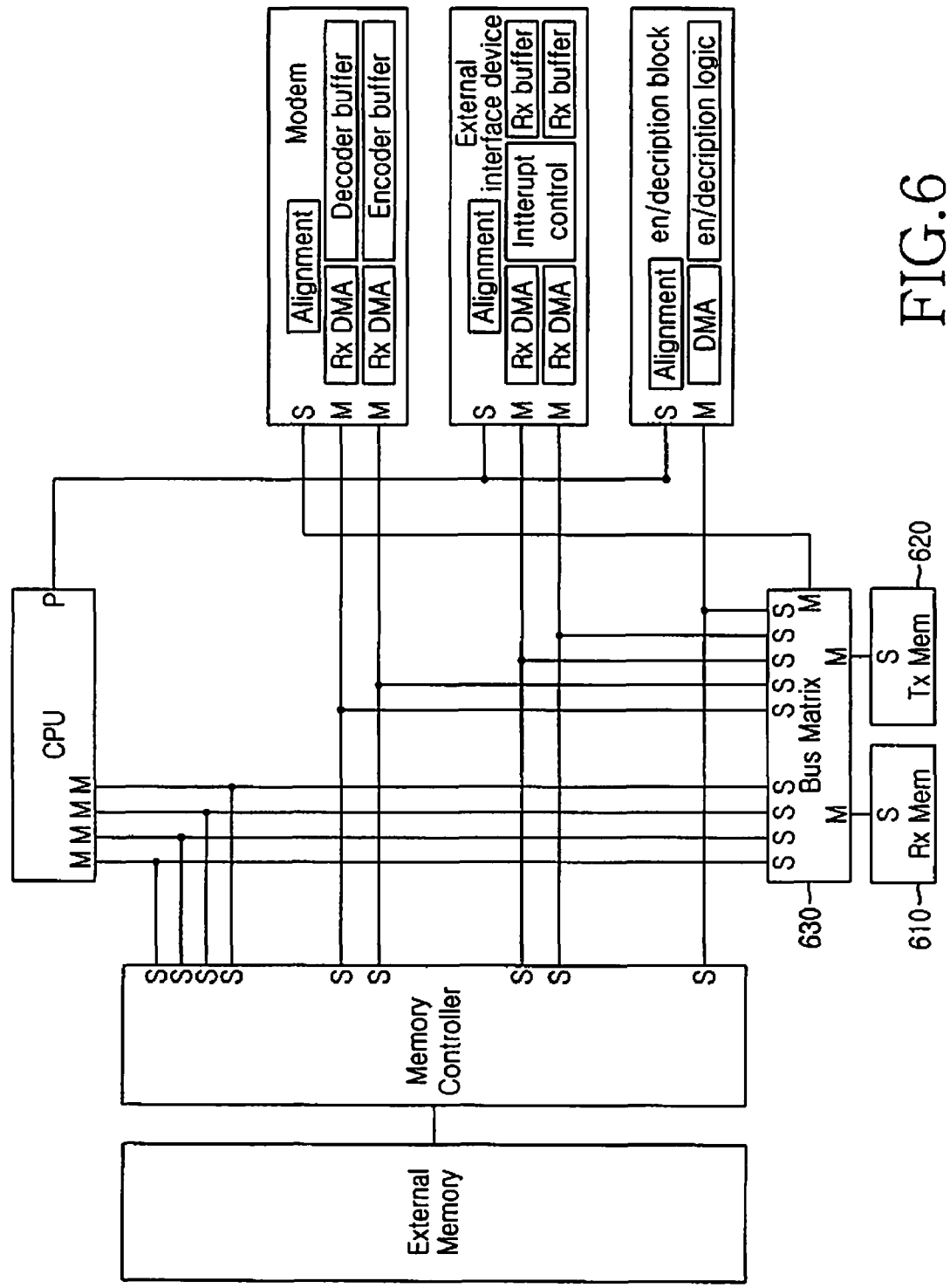
FIG. 6 illustrates a structure of a UE according to a second embodiment of the present invention.

FIG. 6 illustrates a structure of a UE according to a second embodiment of the present invention, which corresponds to a structure capable of simultaneously performing a downlink process and an uplink process.

Referring to FIG. 6, the UE according to the second embodiment of the present invention includes two internal memories divided into a downlink memory 610 and an uplink memory 620. Each of the memories 610 and 620 is connected to the bus matrix 630, so that two IP blocks can simultaneously access the internal memory 610 or 620. Further, as in the embodiment shown in FIG. 5, four IP modules can access the internal memory while performing the data process if a DPRAM is used as the internal memory.

Figure 7:
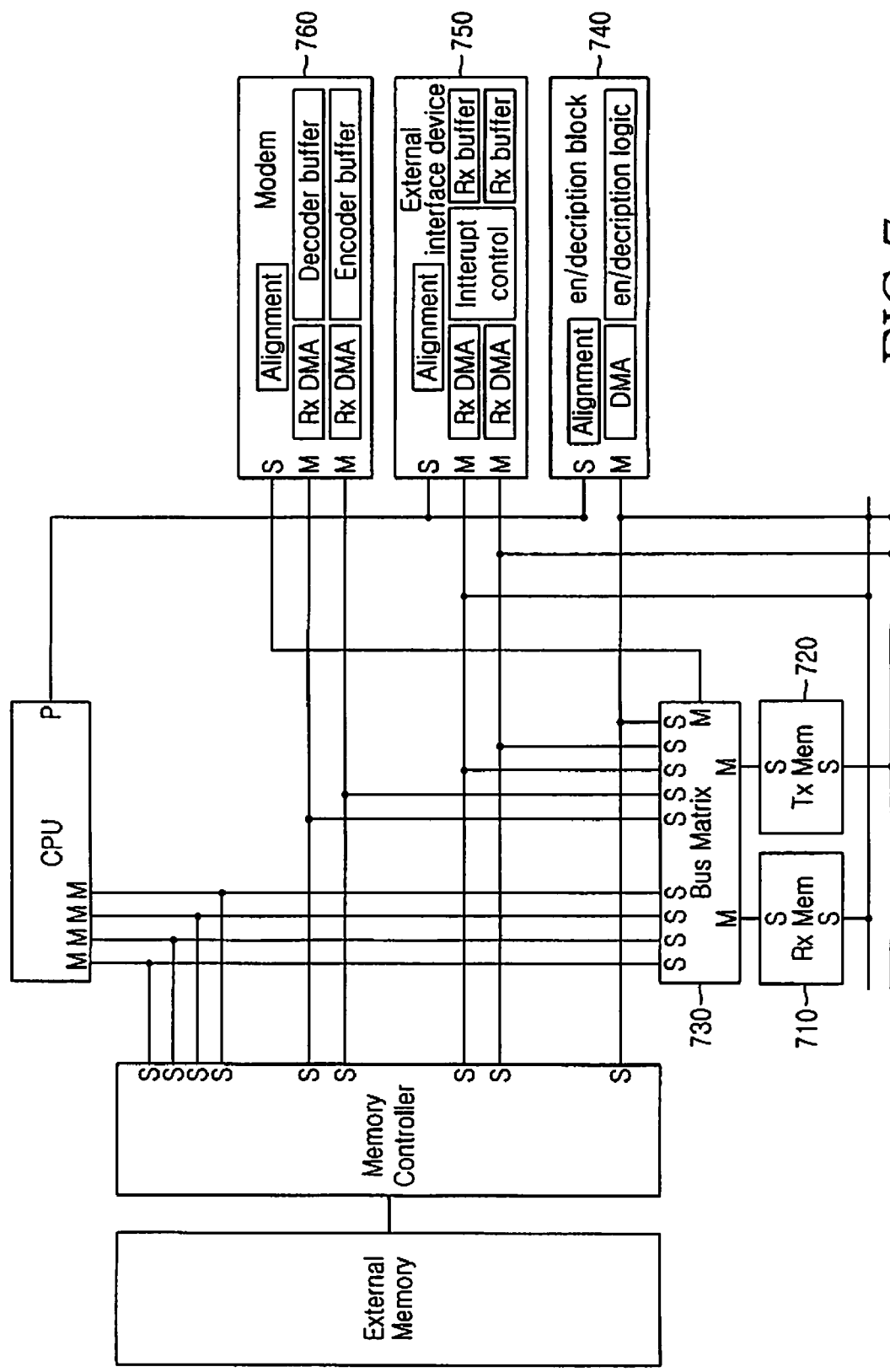
FIG. 7 illustrates a structure of a UE according to a third embodiment of the present invention.

FIG. 7 illustrates a structure of a UE according to a third embodiment of the present invention, which corresponds to a structure capable of simultaneously performing sub-processes of a downlink process and an uplink process.

Referring to FIG. 7, the UE according to the third embodiment of the present invention includes two dual port memories used as internal memories, which are divided into a downlink memory 710 and an uplink memory 720. Each of the memories has one port connected to the bus matrix 730 and another port connected through a direct bus to an IP block, such as a modem 760, an external interface device 750, and an encryption/decryption block 740. By this structure, not only can four IP blocks simultaneously access the internal memory to perform data processes, but also, two ports can directly access IP blocks without passing the bus matrix 730, and thus can perform an independent process. Although the encryption/decryption block 740 and the external interface device 750 are connected to the same bus, because they are sequentially operated in most cases, each of the encryption/decryption block 740 and the external interface device 750 may use an independent bus or may be connected to the bus matrix 730.

Although the structure shown in FIG. 7 is more complicated and requires a larger number of gates than the structures shown in FIG. 5 or 6, it can be said that the structure shown in FIG. 7 is the most efficient structure that can maximize parallel processing.

Hereinafter, an operation of a receiver unit and a transmitter unit of a UE according to an embodiment of the present invention will be described.

A basic process of the receiver unit of the YE modem is as follows. Upon completing decoding of reception data in the modem, a MAC layer transfers the reception data to an external memory. Then, a header of the MAC PDU is analyzed, the RLC PDU data is divided according to each Radio Bearer (RB), and data and information are transferred to the RLC block. The RLC block of each RB analyzes its own RLC PDU header, performs RLC processes, such as reordering, ARQ, and PDCP SDU configuration, and then transfers data and information to the PDCP block. The PDCP block performs PDCP processing and transmits data to a higher application layer.

A basic process of the transmitter unit of the UE modem is as follows. When data from a higher application layer is received by the PDCP block, the PDCP block performs a PDCP process. When transmitting data, the MAC layer determines a transport format according to various conditions, such as resources allocated in the MAC layer, and allocates the resources to each RB. Based on the allocated resources, an RLC block of each RB generates an RLC PDU header and sends the header and data to the MAC layer. Then, the MAC layer generates a MAC PDU header by synthesizing the information of each RB, generates MAC PDU data by interconnecting the header and an RLC PDU of each RB, and records the data in the encoder buffer.

Figure 8A:
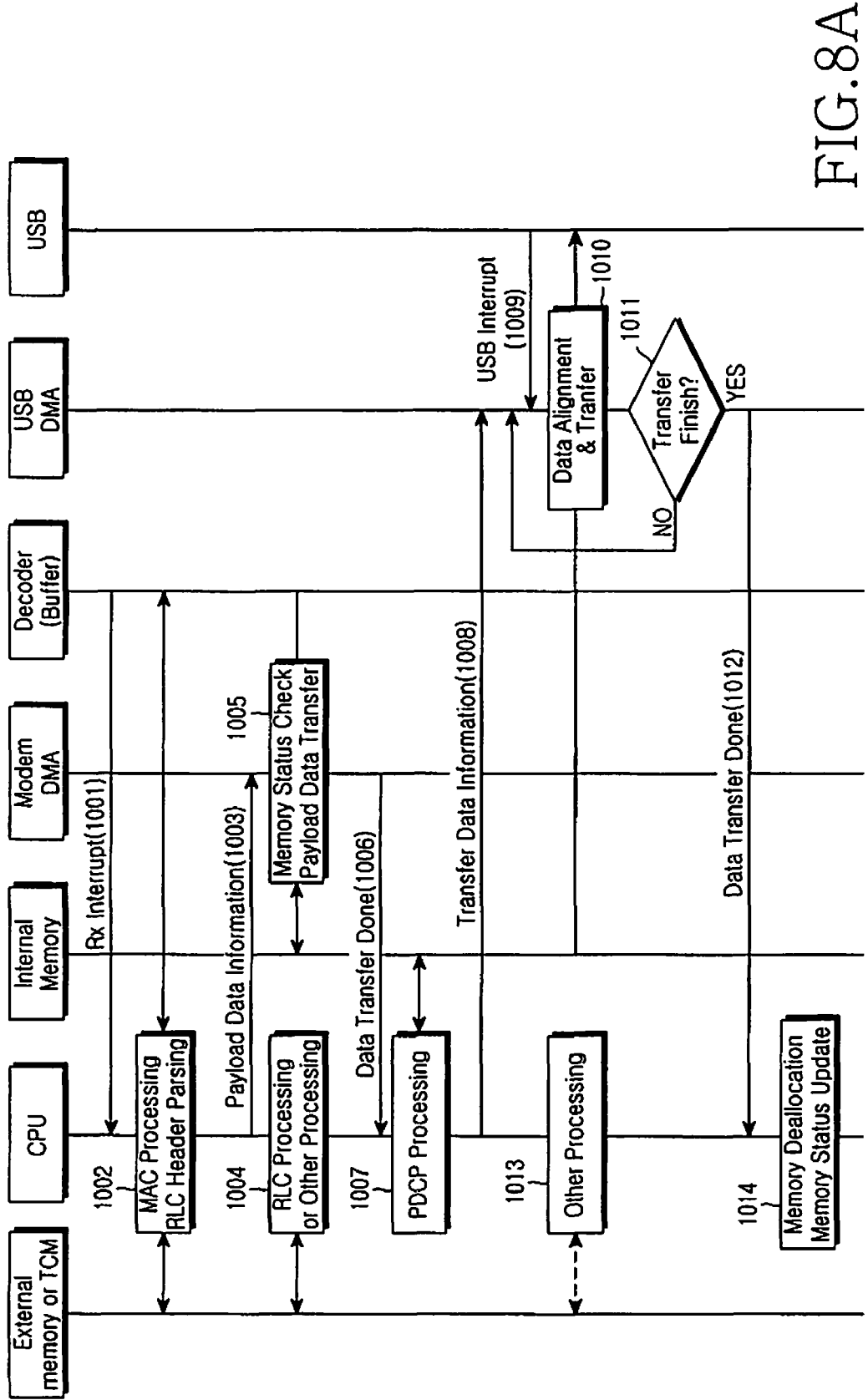
FIGS. 8A and 8B are signal flow diagrams illustrating a data transfer path and a data transfer process in a receiver unit of a UE in a mobile communication system according to an embodiment of the present invention.
Figure 8B:
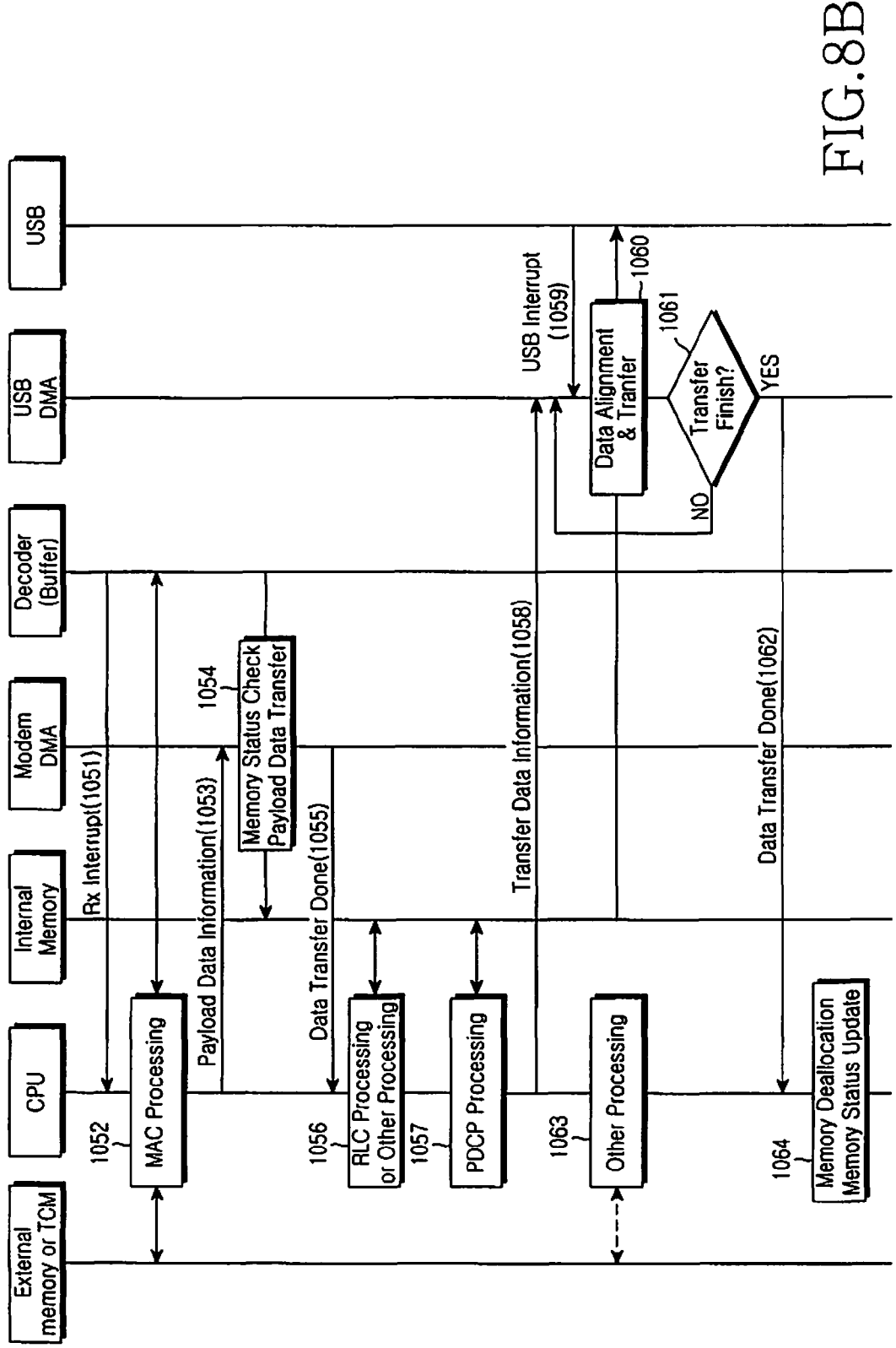

FIGS. 8A and 8B are signal flow diagrams illustrating a data transfer path and a data transfer process in a receiver unit of a UE in a mobile communication system according to an embodiment of the present invention. The process shown in FIG. 8A corresponds to a case of analyzing a MAC header and an RLC header and separating an RLC payload; the process shown in FIG. 8B corresponds to a case of separating only a MAC payload.

Referring to FIG. 8A, when a decoder completes decoding and an interrupt occurs in step 1001, the CPU does not transfer reception data to the external memory and obtains data information from a payload by analyzing only a header of the data in step 1002. Then, in steps 1003 to 1006, the CPU stores header information and payload data in different memories, respectively. Specifically, in a state in which data exists in the decoder, the CPU analyzes the MAC header and the RLC header in step 1003, and writes information, such as a start position and size of each piece of payload data and position for transmitting the payload data, in a descriptor of a modem-embedded reception DMA (modem DMA) by using the analyzed information in step 1005. Meanwhile, the modem DMA analyzes the content of the descriptor and transmits the payload data to an appointed position in step 1006. Simultaneously, in step 1004, the CPU performs an RLC process by using the header information stored in step 1003. The data transmission of step 1005 and the CPU process of step 1003 can be performed in parallel. Moreover, the CPU can perform another process, such as signaling or measurement, when the process required in step 1003 is completed. If a PDCP SDU is configured while performing the RLC process, the CPU notifies the location and size of each piece of payload data constituting the PDCP SDU to a PDCP block. When the RLC process and payload data transmission are completed, the CPU performs the PDCP process in steps 1007 and 1008. From among the PDCP processes, some processes, such as decoding for accessing the payload data, can be performed by hardware based on a command from the CPU. Although a PDCP block in the LTE performs the decoding, an RLC block may perform the decoding according to another standard. By designing such a payload data process to be implemented by hardware as much as possible so that the payload data process can be performed simultaneously with the CPU process, it is possible to improve the performance of the UE.

Further, according to the present invention, a USB-embedded transmission DMA (USB DMA) may process the USB interrupt, so that the CPU can perform another process. In a conventional UE, since the CPU processes the USB interrupt, a large load is imposed on the CPU in order to process the USB interrupt multiple times within one Transmission Time Interval (TTI) according to the size of the USB buffer, which serves as an important reason to limit the data throughput. However, according to the present invention, when an IP packet to be transmitted from a PDCP block to an application block is configured, the CPU records information of each piece of payload data constituting the IP packet in a descriptor of the USB DMA in step 1008. In steps 1009 to 1012, the USB DMA performs interrupt processes, such as data transmission and flag setting, while receiving the USB interrupt. Simultaneously, in step 1013, the CPU can perform another process, i.e., can perform parallel processing. When the data transmission has been completed, the CPU deletes the data in the memory and updates the state of the memory in step 1014. Although FIG. 8A employs a USB as an example, the same method and apparatus can be applied to another external interface device.

Referring to FIG. 8B, when a decoder completes decoding and an interrupt occurs in step 1051, the CPU does not transfer reception data to the external memory and obtains data information from a payload by analyzing only a header of the data in step 1052. Then, in steps 1053 and 1054, the CPU stores header information and payload data in different memories, respectively. That is, in a state in which data exists in the decoder, the CPU analyzes the MAC header in step 1053, and writes information, such as a start position and size of each piece of payload data and position for transmitting the payload data, in a descriptor of a modem-embedded reception DMA (modem DMA) by using the analyzed information in step 1054. Meanwhile, the modem DMA analyzes the content of the descriptor and transmits the payload data to an appointed position in step 1055. Further, at the time of transmitting the payload data, the CPU performs another process, such as signaling or measurement. When the payload data transmission is completed, the CPU analyzes an RLC header and performs an RLC process in step 1056. If a PDCP SDU is configured while performing the RLC process, the CPU notifies the location and size of each piece of payload data constituting the PDCP SDU to a PDCP block. When the RLC process is completed, the CPU performs the PDCP process in steps 1057. Further, if an IP packet to be transmitted from a PDCP block to an application block is configured, the CPU records information on each piece of payload data constituting the IP in the descriptor of the USB DMA in step 1058. In steps 1059 to 1062, the USB DMA performs interrupt processes, such as data transmission and flag setting, while receiving the USB interrupt process. Simultaneously, in step 1063, the CPU can perform another process, i.e., the CPU can perform parallel processing. When the data transmission has been completed, the CPU deletes the data in the memory and updates the state of the memory in step 1064. Although FIG. 8B employs a USB device as an example, the same method and apparatus can be applied to another external interface device.

Figure 9:
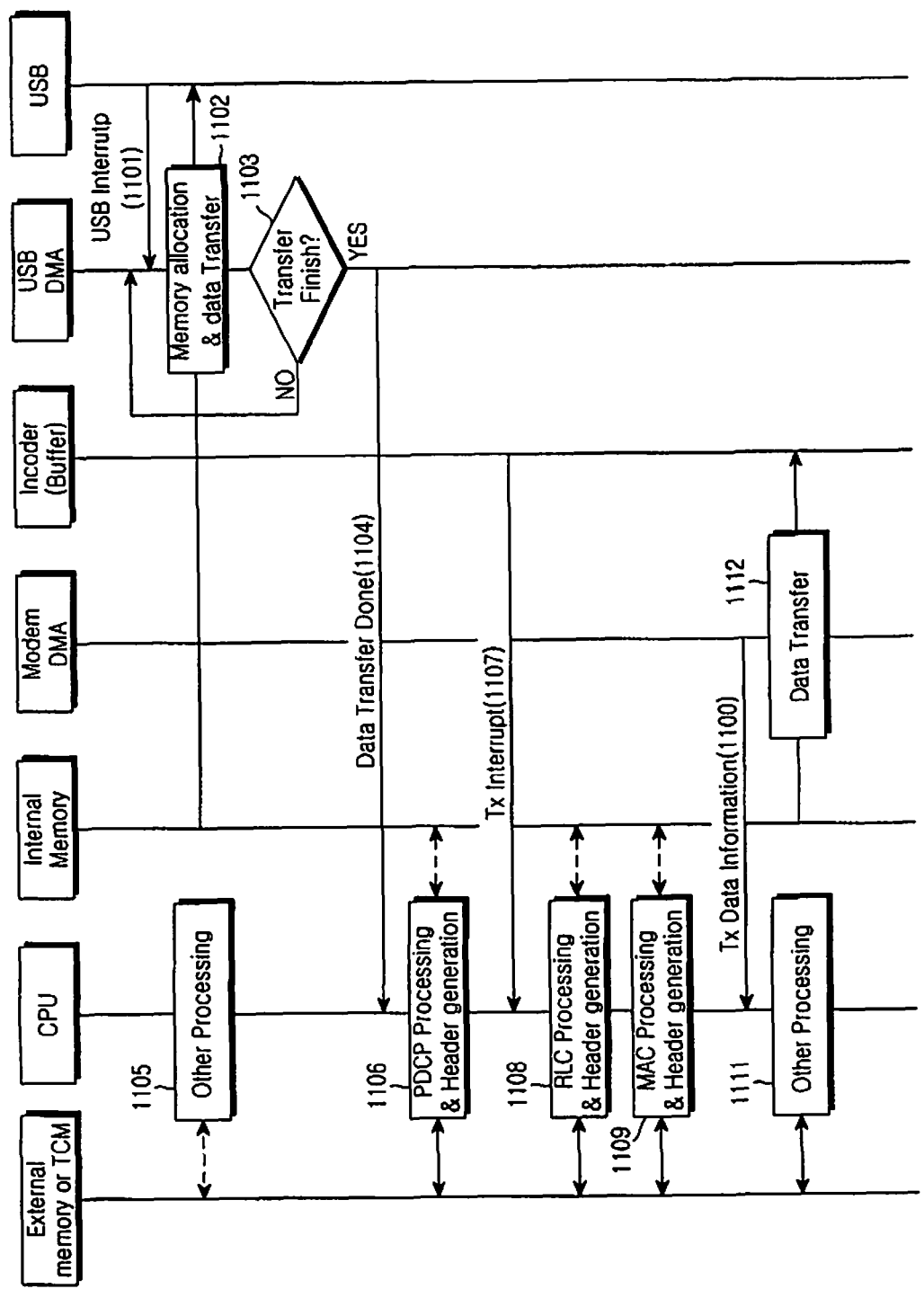
FIG. 9 illustrates a signal flow diagram illustrating a data transfer path and a data transfer process in a transmitter unit of a UE in a mobile communication system according to an embodiment of the present invention.

FIG. 9 illustrates a signal flow diagram illustrating a data transfer path and a data transfer process in a transmitter unit of a LE in a mobile communication system according to an embodiment of the present invention.

Referring to FIG. 9, when an IP packet is received in an application block, the CPU allocates a memory and notifies it to the USB DMA. In steps 1101 to 1104, the USB DMA performs an interrupt process, such as data transfer, while receiving a USB interrupt. The CPU can also simultaneously perform another process in step 1105. When the data transfer is completed and a "data transfer done" signal is received from the USB DMA in step 1104, the CPU performs PDCP processes, such as header compression and ciphering, in step 1106.

In the transmitter unit also, it is advantageous to implement the payload data process, such as encryption, by hardware. When an encryption/decryption block includes an embedded DMA as shown in FIG. 5 so that a CPU notifies data information and information necessary for the encryption/decryption to the embedded DMA and the embedded DMA reads the data and performs the encryption/decryption based on the information, a data process and a CPU process can be simultaneously performed in parallel. Then, the transmitter unit does not need to refer to the payload data. Therefore, the CPU process and the payload data process are perfectly separated and can be processed in parallel.

When an uplink resource of the UE is allocated and an outgoing interrupt occurs in step 1107, the CPU determines a transport format by combining allocated resource sizes with various parameters and configures a MAC PDU through a MAC/RLC process in steps 1108 to 1110. During this process, RLC/MAC header information is generated. In a conventional UE, a single connected MAC PDU is configured by copying header information and payload data. However, according to the present invention, in order to reduce the data copy, header information is separately generated, and the generated header information and the payload data are sequentially recorded in the descriptor of the modem DMA. Then, the modem DMA transmits the data to the encoder according to given information in step 1112. During this process, byte or word alignment is performed by hardware based on the given size information of each piece of data. Although FIG. 9 employs a USB as an example of an interface to an application block, the same method and apparatus can be applied to another external interface device.

Figure 10A:
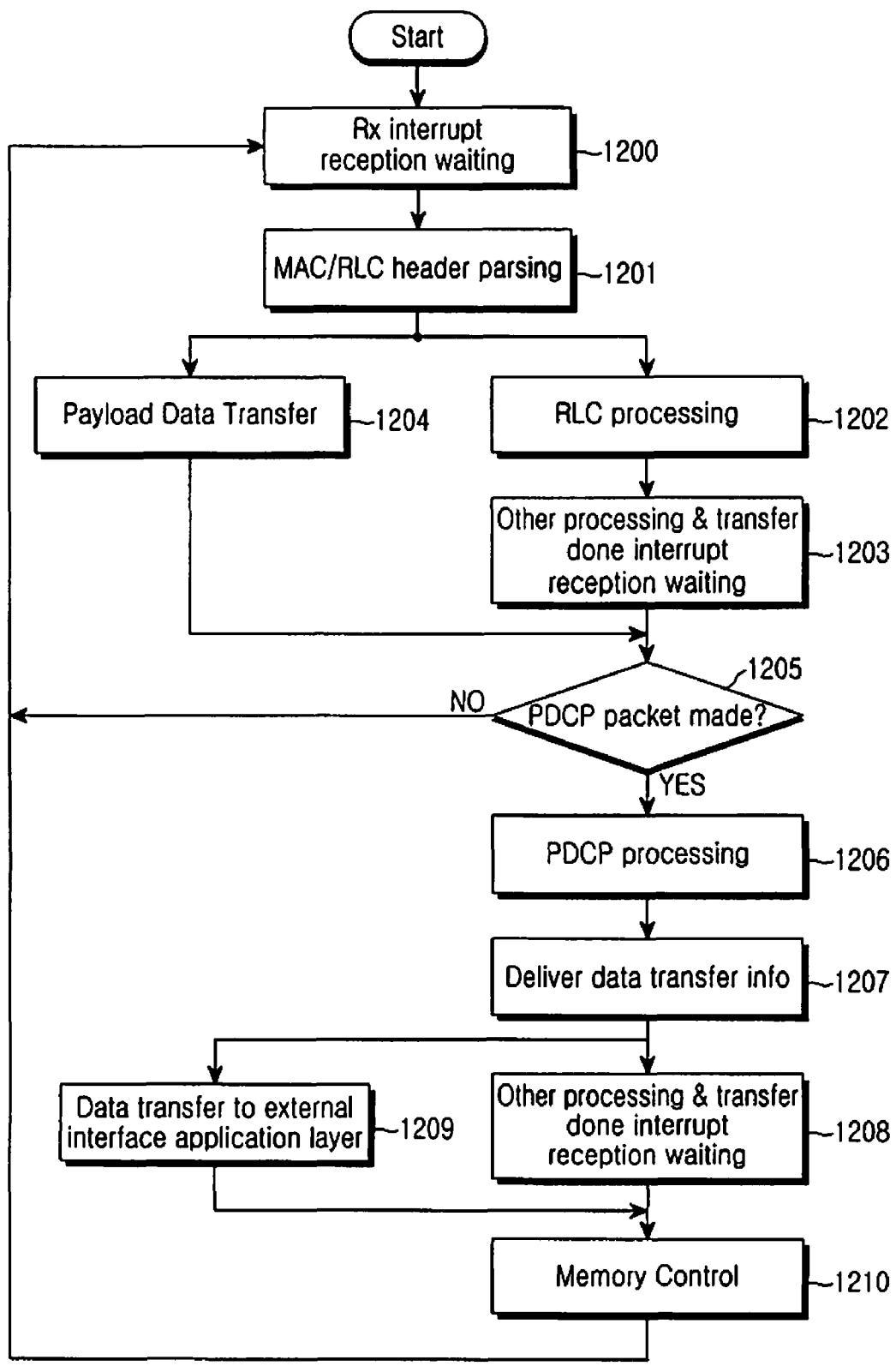
FIGS. 10A and 10B are flow diagrams illustrating a general operation of a receiver unit of a UE in a mobile communication system according to an embodiment of the present invention.
Figure 10B:
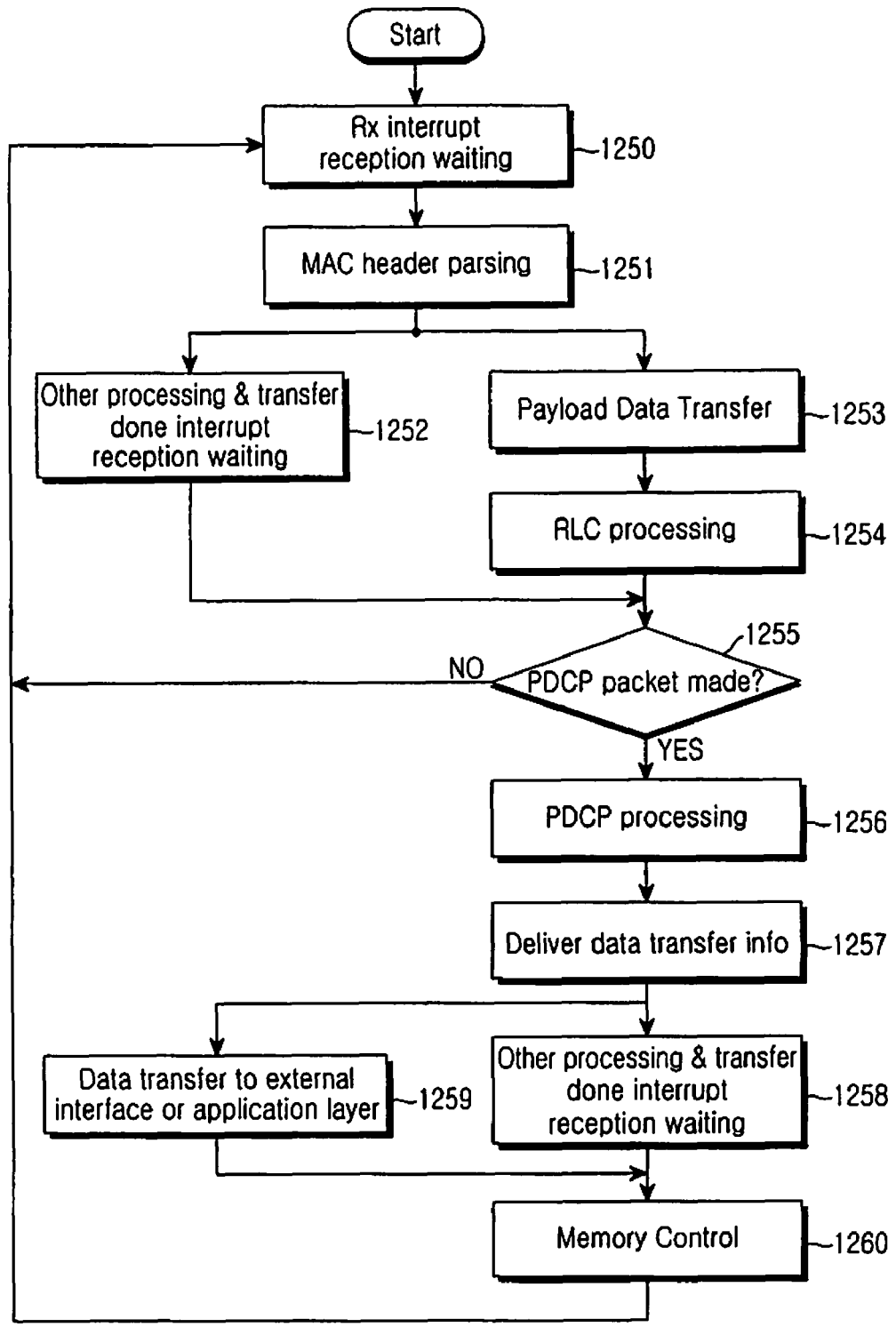

FIGS. 10A and 10B are flow diagrams illustrating a general operation of a receiver unit of a UE in a mobile communication system according to an embodiment of the present invention.

Referring to FIG. 10A, when the UE receives an incoming interrupt in step 1200, the UE parses a MAC/RLC header in step 1201. In step 1204, the UE simultaneously performs payload data transfer, and performs an RLC process in step 1202 and waits for reception of a transfer completion interrupt while performing another process in step 1203. Upon receiving the transfer completion interrupt, the UE determines in step 1205 whether a PDCP packet has been generated. If a PDCP packet has not been generated, the UE returns to step 1200. If a PDCP packet has been generated, the UE performs the PDCP process, in step 1206, and delivers data transfer information in step 1207. Further, the UE transfers data to an external interface or application layer in step 1209, and simultaneously performs another process and then waits for reception of the transfer completion interrupt in step 1208. Upon receiving the transfer completion interrupt, the UE performs memory control in step 1210 and then returns to step 1200.

Referring to FIG. 10B, when the UE receives an incoming interrupt in step 1250, the UE parses a MAC header in step 1251. The UE performs payload data transfer in step 1253, performs an RLC process in step 1254, and waits for reception of a transfer completion interrupt while simultaneously performing another process in step 1252. Upon receiving the transfer completion interrupt, the UE determines, in step 1255, whether a PDCP packet has been generated. If a PDCP packet has not been generated, the UE returns to step 1250. If a PDCP packet has been generated, the LIE performs the PDCP process in step 1256 and delivers data transfer information in step 1257. Further, the UE simultaneously transfers data to an external interface or application layer in step 1259, and performs another process and then waits for reception of the transfer completion interrupt in step 1258. Upon receiving the transfer completion interrupt, the UE performs memory control in step 1260 and then returns to step 1250.

Figure 11:
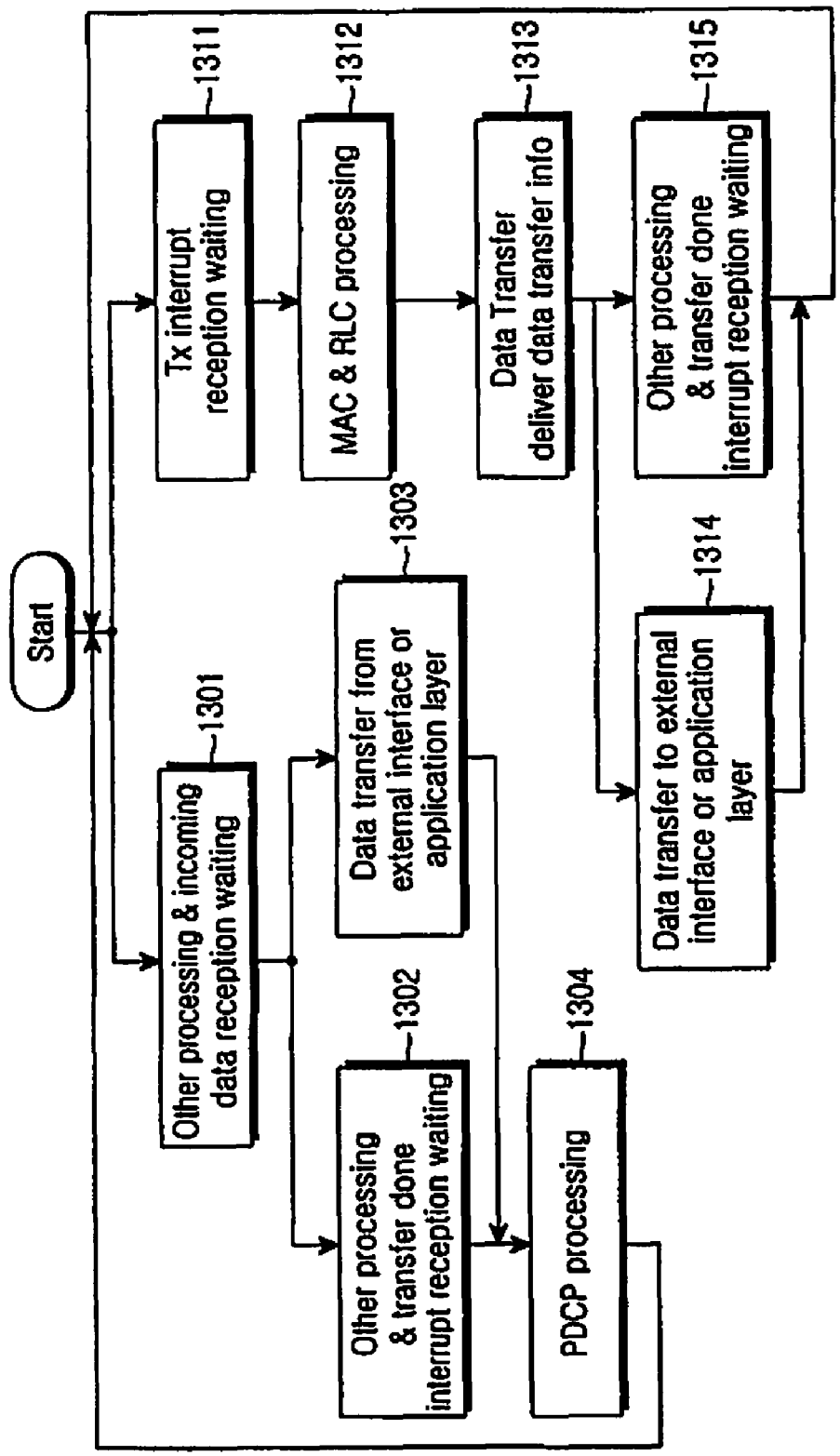
FIG. 11 is a flow diagram illustrating a general operation of a transmitter unit of a UE in a mobile communication system according to an embodiment of the present invention.

FIG. 11 is a flow diagram illustrating a general operation of a transmitter unit of a UE in a mobile communication system according to an embodiment of the present invention.

Referring to FIG. 11, when an outgoing interrupt is received in step 1311, the UE performs a MAC/RLC process in step 1312, and then delivers data transfer information in step 1313. Further, the UE transfers the data to an external interface or application layer in step 1314, and waits for reception of a transfer completion interrupt after performing another process in step 1315. When a transfer completion interrupt is received, the UE returns to the start point.

Meanwhile, in step 1301, the UE waits for data input while performing another process in step 1301. When there is data input, the UE transfers the data from an external interface or application layer in step 1303, and waits for reception of a transfer completion interrupt while simultaneously receiving another process in step 1302. When a transfer completion interrupt is received, the UE performs the PDCP process in step 1304 and then returns to the start point.

Meanwhile, by using an internal memory as described above, it is possible to nearly independently design physical paths for performing the CPU process and the payload data process; it is also possible to perform parallel processing except for the case requiring sequential processing. However, use of an internal memory increases the size and price of the modem chip. Therefore, the present invention proposes a method of using both the internal memory and the external memory in order to minimize the internal memory.

In general, the size of a memory necessary for an ARQ process of an RLC block is determined based on the worst condition. Therefore, the size of the memory is set to be much larger than a size of memory necessary for a normal situation. However, the present invention provides a method of setting a size of an internal memory to a size necessary for a normal situation while using a necessary size of memory allocated from an external memory in an abnormal situation in which the internal memory has been exhausted. According to this method, since a part of the payload data is stored in the external memory, it is impossible to achieve perfect parallel processing. Since it is highly probable that the abnormal situation in which the internal memory has been exhausted may happen in the case of a low transmission/reception data rate, use of the external memory in the abnormal situation does not have a big influence on the transmission/reception capability of the UE. Especially, in the case of LTE using a "HARQ assisted ARQ" scheme, an ARQ NACK rarely occurs and thus a situation requiring use of the external memory rarely occurs. The size of the internal memory is properly determined according to the ARQ processing scheme of each standard.

Also, the encryption/decryption block according to the present invention may employ processes according to various embodiments. Since the encryption/decryption process is performed bit by bit, the input data and the output data have the same size and are mapped bit by bit. When decoding is performed in the receiver unit, input data may be sometimes scattered over multiple positions within the memory without being interconnected. At this time, memory usage can be minimized by reading and processing data in the memory based on information given by a CPU and then recording the processed data at the same location. When the memory has a margin, the data after decoding may be interconnected and then recorded in another location in the memory, so that the scattered data can be collected into a single piece of connected data that can be more effectively transferred thereafter.

Further, the descriptors used in the embedded DMA may also be implemented in various ways. For example, either the descriptors may be implemented by a particular number of registers in the DMA, or only one descriptor or a predetermined number of descriptors may be implemented in the DMA while the other descriptors are implemented in the form of connection list in a memory. In this case, the memory may be an external memory, a Tightly-Couple Memory (TCM), or an internal memory, which have different capabilities according to their types, respectively. In the case of the two examples mentioned above, the descriptor or descriptors should be separately arranged and the CPU should record all data information in the descriptor or descriptors. Besides, the CPU may share the connection list used while performing the header process with the hardware DMA. That is, the CPU notifies only the start location of the connection list and the DMA accesses the connection list, obtains data from the connection list, and then transfers the obtained data.

The present invention as described above has the following effects.

According to the present invention, transmission/reception data of a UE is divided into header information and payload data, which are then stored in different memories, respectively. Then, CPU processes, such as ARQ using header information, and payload data processes, such as data transmission using payload data and encryption/decryption, are performed in parallel. By the parallel processing, it is possible to increase throughput of the transmission/reception data even by the same system dimensions, such as a CPU/bus clock.

Further, according to the present invention, an embedded DMA is used and a data alignment block is implemented by hardware, so as to remove a data copy process and minimize data transmission. Therefore, the present invention can increase the data throughput of transmission/reception data by a UE Furthermore, according to the present invention, an internal memory is used and an internal bus structure is effectively designed. Therefore, the present invention can reduce data processing time by reducing time of accessing an external memory and increasing the rate of parallel processing.

In addition, the present invention can increase the data throughput of a UE, which is less than 10 Mbps in the case of a conventional UE, up to about 100 Mbps, and thus can implement next generation high-speed communication UE.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for processing incoming data in a mobile communication system supporting high-speed data communication, the method comprising the steps of:
    analyzing, by a Central Processing Unit (CPU) included in a User Equipment (UE) apparatus, data that has been received from a Node B and decoded and transferring information on the analyzed data to an embedded Direct Memory Access (DMA) of a modem included in the UE apparatus;
    transferring, by the embedded DMA of the modem, payload data of the decoded data to an internal memory included in the UE apparatus using the information;
    performing, by the CPU, a Medium Access Control (MAC) process and a Radio Link Control (RLC) process;
    performing a Packet Data Convergence Protocol (PDCP) process using a position and size of payload data of a PDCP packet when the PDCP packet is included in the RLC process;
    transferring, by an embedded DMA of an external interface device included in the UE apparatus, payload data of an Internet Protocol (IP) packet to the internal memory when the IP packet is included in the PDCP process; and
    performing, by the embedded DMA of the external interface device, an interrupt process while receiving an external interface device interrupt,
    wherein the steps performed by the embedded DMA of the modem, the embedded DMA of the external interface device and the CPU are performed in parallel, respectively, and
    wherein the interrupt process comprises at least one of a flag setting process, an encryption process, a decryption process and a data alignment process.

2. The method of claim 1, wherein the CPU is adapted to perform another process, during which the payload data are transferred by at least one of the modem and the external interface device.

3. A method for processing outgoing data in a mobile communication system supporting high speed data communication, the method comprising the steps of:
    transferring, by an embedded Direct Memory Access (DMA) of an external interface device included in a User Equipment (UE) apparatus, payload data of an Internet Protocol (IP) packet to an internal memory included in the UE apparatus when the IP packet is received;
    performing, by the embedded DMA of the external interface device, an interrupt process while receiving an external interface device interrupt,
    generating, by a Central Processing Unit (CPU) included in the UE apparatus, a Packet Data Convergence Protocol (PDCP) header through a PDCP process, storing the generated PDCP header in an external memory included in the UE apparatus and storing payload data of a PDCP packet in the internal memory;
    generating, by the CPU, a Radio Link Control (RLC) header through an RLC process, storing the generated RLC header in the external memory and storing payload data of a RLC packet in the internal memory, when a transfer interrupt occurs from an encoder included in the UE apparatus;
    generating, by the CPU, a Medium Access Control (MAC) header through a MAC process, storing the generated MAC header in the external memory and storing a payload data of a MAC packet in the internal memory; and
    reading, by an embedded DMA of a modem included in the UE apparatus, the header stored in the external memory and the payload data stored in the internal memory and transferring the read header and payload data to the encoder according an instruction of the CPU,
    wherein the steps performed by the embedded DMA of the external interface device, the embedded DMA of the modem and the CPU are performed in parallel respectively, and
    wherein the interrupt process comprises at least one of a flag setting process, an encryption process, a decryption process and a data alignment process.

4. The method of claim 3, wherein the CPU is adapted to perform another process, while the payload data is transferred by at least one of the modem and the external interface device.

5. A User Equipment (UE) apparatus for supporting high speed data communication, the UE comprising:
    a memory device including at least one internal memory and at least one external memory;
    a Central Processing Unit (CPU) for performing a Medium Access Control (MAC) process, a Radio Link Control (RLC) process and a Packet Data Convergence Protocol (PDCP) process;
    an embedded Direct Memory Access (DMA) of an external interface device for storing a payload of an Internet Protocol (IP) packet in the internal memory, and performing an interrupt process while receiving an external interface device interrupt;
    an embedded DMA of a modem for storing payload data of incoming data or outgoing data in the internal memory;
    a decoder for decoding the incoming data received from a Node B;
    an encoder for encoding the outgoing data; and
    a bus device for interconnecting the internal and external memories of the memory device with the modem, the external interface device and the CPU while preventing overlapping of data paths between the internal and external memories and the modem, the external interface device and the CPU, wherein the interrupt process comprises at least one of a flag setting process, an encryption process, a decryption process and a data alignment process.

6. The UE apparatus of claim 5, wherein the CPU analyzes data that has been received from a Node B and decoded, transfers information on the analyzed data to the modem, performs the MAC process and the RLC process and performs the PDCP process using a position and size of payload data of a PDCP packet when the PDCP packet is included in the RLC process.

7. The UE apparatus of claim 6, wherein the modem transfers payload data of the decoded data to the internal memory using the information.

8. The UE apparatus of claim 5, wherein the CPU generates a PDCP header through the PDCP process, stores the generated PDCP header in the external memory and stores payload data of a PDCP packet in the internal memory, generates an RLC header through the RLC process, stores the generated RLC header in the external memory and stores a payload data of a RLC packet in the internal memory, when a transfer interrupt occurs from an encoder and generates a MAC header through the MAC process, stores the generated MAC header in the external memory and stores a payload data of a MAC packet in the internal memory.

9. The UE apparatus of claim 8, wherein the modem reads the header stored in the external memory and the payload data stored in the internal memory and transfers the read header and payload data to the encoder according an instruction of the CPU.

10. The UE apparatus of claim 5, wherein the CPU is adapted to perform another process, while the payload data is transferred by at least one of the modem and the external interface device.

11. The UE apparatus of claim 5, wherein the memory device comprises the at least one external memory and one single port internal memory,
   wherein the single port internal memory is commonly used for both downlink and uplink.

12. The UE apparatus of claim 5, wherein the memory device comprises the at least one external memory and one dual port internal memory,
   wherein two devices among the CPU, the external interface device and the modem are adapted to simultaneously access the internal memory through dual ports of the dual port internal memory.

13. The UE apparatus of claim 5, wherein the memory device comprises the at least one external memory and at least two dual port internal memories, and the dual port internal memories are separately used for downlink and uplink, respectively.

* * * * *